(12) United States Patent
Takahashi et al.

(10) Patent No.: US 6,273,631 B1
(45) Date of Patent: Aug. 14, 2001

(54) CONNECTING ROD EQUIPPED WITH BALL JOINTS CAPABLE OF ADJUSTING THE DISTANCE BETWEEN THE CENTERS

(75) Inventors: Kunihisa Takahashi; Takashi Sakae, both of Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 09/449,633

(22) Filed: Nov. 30, 1999

(30) Foreign Application Priority Data

Dec. 4, 1998 (JP) .................................................. 10-345326

(51) Int. Cl.$^7$ ........................................................ G05G 1/00
(52) U.S. Cl. ........................... 403/104; 403/363; 74/586
(58) Field of Search ................................ 74/586; 403/83, 403/87, 110, 80, 143, 168, 363, 380, 104, 71

(56) References Cited

U.S. PATENT DOCUMENTS

| | | | |
|---|---|---|---|
| 1,318,611 | * 10/1919 | Shaffer | 74/586 |
| 1,828,891 | * 10/1931 | Crawford et al. | 74/586 |
| 2,584,709 | * 2/1952 | Johnson | 74/586 |
| 2,695,504 | * 11/1954 | Magee | 403/104 X |
| 2,839,949 | * 6/1958 | Buell et al. | 74/586 |
| 3,617,078 | * 11/1971 | Valukonis | 74/586 |
| 3,745,853 | 7/1973 | Deibel et al. | |
| 3,782,221 | * 1/1974 | Nalodka et al. | 74/586 |
| 4,557,622 | 12/1985 | Chalmers . | |
| 5,070,609 | 12/1991 | Teramachi . | |
| 5,299,469 | 4/1994 | Meyer et al. . | |

FOREIGN PATENT DOCUMENTS

| | | | |
|---|---|---|---|
| 3028868 | * 2/1982 | (DE) | 74/586 |
| 2013818 | 8/1999 | (GB) . | |

OTHER PUBLICATIONS

Abstract of Japanese Patent Publ. No. 10159818; dated Jun. 16, 1998.

* cited by examiner

Primary Examiner—Lynne H. Browne
Assistant Examiner—David E. Bochna
(74) Attorney, Agent, or Firm—Arent Fox Kintner Plotkin & Kahn, PLLC

(57) ABSTRACT

A connecting rod includes first and second ball joints made of ball-shanks and holders tiltably connected with the ball-shanks. A connecting portion, which connects the holders of the first and second ball joints, adjusts the distance between the centers of the ball-shanks. The connecting portion includes first and second connecting arms integrally formed with the holders of the first and second ball joints and on which a plurality of positioning concaves and convexes which are meshed with each other are respectively arranged in a longitudinal direction. A fixing device engages the first and second connecting arms with each other in the condition where the positioning concaves and convexes of the first and second connecting arms mesh with each other.

5 Claims, 7 Drawing Sheets

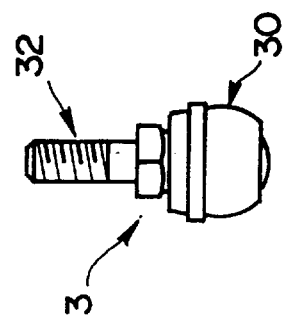
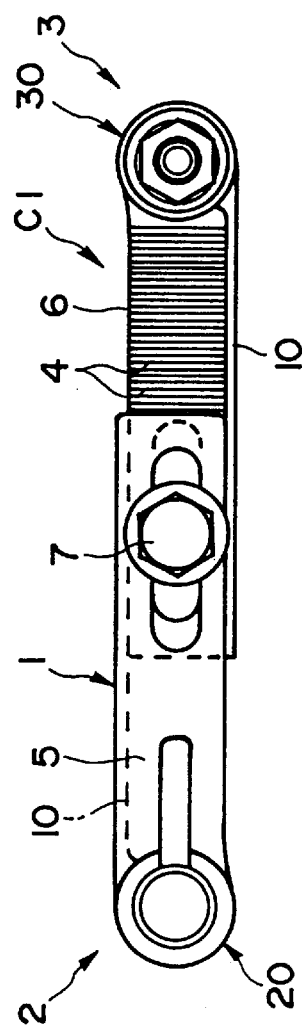
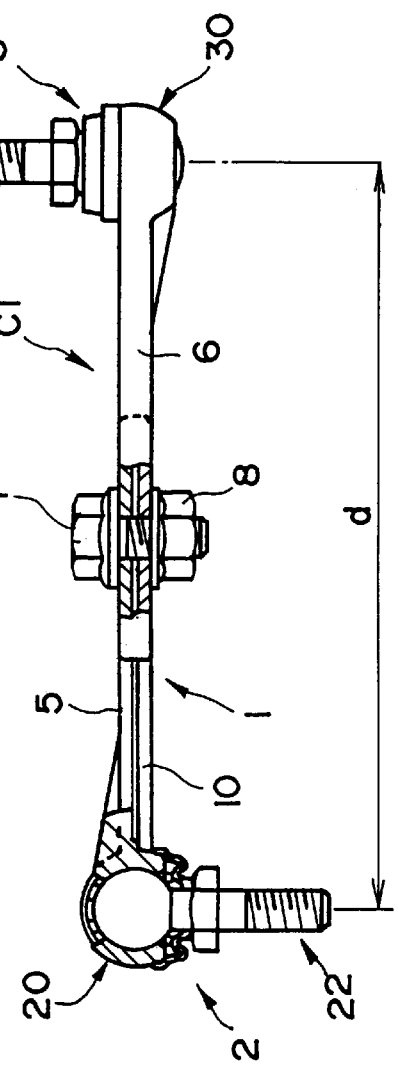

CONNECTING ROD EQUIPPED WITH BALL JOINTS CAPABLE OF ADJUSTING THE DISTANCE BETWEEN THE CENTERS

FIELD OF THE INVENTION AND RELATED ART STATEMENT

This invention relates to a connecting rod or a con rod which is provided with a pair of ball joints at both ends of a rod-like connecting portion, and more particularly, to an improvement of a connecting rod which is capable of freely adjusting the distance between pivoting centers of these ball joints by means of the connecting portion.

In transmission control parts of automobiles, link mechanism parts of height control sensors and various other automatic machines or the like, many examples where a link motion mechanism uses a connecting rod provided with a pair of ball joints at both ends of a rod-like connecting portion have been observed. To ensure the smooth and accurate operation of such a link mechanism, in some cases, it becomes necessary to perform the adjustment of the distance between pivoting centers of a pair of ball joints (hereinafter called the adjustment between the centers).

Conventionally, as such a connecting rod which is capable of performing the adjustment between the centers, connecting rods disclosed in Japanese laid-open patent publication Hei 10-159818 and the like have been known. In these connecting rods, female threaded portions for connection are respectively formed in a pair of ball joints such that the female threaded portions have threading directions opposite from each other, and on both ends of the rod-like connecting portion to which these ball joints are joined, male threaded portions which are engaged with the female threaded portions are formed. By rotating the connecting portion, an amount of thread engagement between the male threaded portion and the female threaded portion is adjusted and hence, the distance between the centers of a pair of ball joints can be adjusted. Furthermore, lock nuts are respectively engaged with respective male threaded portions of the connecting portion and they prevents the relative rotation between the connecting portion and respective ball joints by fastening these lock nuts after the completion of the adjustment so as not to spoil the adjusted distance between the centers by an unintentional rotation of the connecting portion.

In these conventional connecting rods, however, at the time of performing the adjustment between centers, a pair of lock nuts must be loosened first and then the connecting portion must be rotated to adjust an amount of thread engagement between the female threaded portion and the male threaded portion, and after the completion of the adjustment, a pair of lock nuts must be fastened again and hence, there has been a problem that the operation to perform the adjustment between the centers is cumbersome.

In addition, there has been a problem that it is necessary to perform tapping of the female threaded portions and the male threaded portions at respective ball joints and the connecting portion so that the machining cost is increased by an amount corresponding to such an additional machining, while a pair of lock nuts are necessary so that the number of parts is increased thus pushing up the manufacturing cost.

OBJECT OF SUMMARY OF THE INVENTION

The present invention has been made in view of the above-mentioned problems and it is an object of the present invention to provide a connecting rod equipped with ball joints which can easily adjust the distance between pivoting centers of a pair of ball joints provided to both ends of a connecting portion and can manufacture the connecting rods at a low cost.

To achieve the above-mentioned object, in the connecting rod equipped with ball joints according to the present invention which comprises first and second ball joints which are made of ball-shanks and holders tiltably connected with ball-shanks and a connecting portion which connects the holders of the first and second ball joints and is capable of adjusting the distance between the centers of a pair of the ball-shanks, the improvement is characterized in that the connecting portion is comprised of first and second connecting arms which are integrally formed with the holders of the first and second ball joints and on which a plurality of positioning teeth which are meshed with each other are respectively arranged in a longitudinal direction, and fixing means which makes the first and second connecting arms engaged with each other in the condition that the positioning teeth of the first and second connecting arms are meshed with each other.

Due to such a technical means, by engaging the first and second connecting arms which are integrally formed with holders of the first and second ball joints with each other by means of the fixing means, the connecting portion which connects the holders of the first and second ball joints is formed. Here, a plurality of positioning teeth are arranged on the first and second connecting arms respectively in a longitudinal direction and the connecting arms are engaged with each other in the condition that these positioning teeth are meshed with each other and hence, by merely loosening the engaged condition produced by the fixing means and thereafter shifting the meshed position of the teeth of the first connecting arm and the teeth of the second connecting arm, the length of the connecting portion, that is, the distance between the centers of the first ball joint and the second ball joint can be easily adjusted.

Furthermore, by arranging the positioning teeth at a given pitch relative to respective connecting arms, at the time of changing the distance between the centers of the first ball joint and the second ball joint, the distance between the centers can be easily shortened or extended by an aimed distance by counting the number of these positioning teeth.

Furthermore, the first and second connecting arms can be molded integrally with the holders by die casting or the like at the time of forming the holders. In such a case, since the above-mentioned positioning teeth can be simultaneously molded with respective connecting arms, the connecting rods can be easily manufactured and the manufacturing cost can be reduced.

On the other hand, with respect to the above-mentioned fixing means, the specific construction thereof can be properly changed so long as the first and second connecting arms can be engaged in the condition that the positioning teeth are meshed with each other. In the simplest case, the fixing means may be comprised of a bolt which passes through the first and second connecting arms and a nut which is engaged with the bolt so as to fasten these connecting arms. In case the bolt and the nut are used as the fixing means, the adjustment between the centers can be readily performed by merely loosening the connecting arms fastened by the bolt and the nut first, and then changing the meshed condition of the positioning teeth, and thereafter fastening the connecting arms by the bolt and the nut again.

BRIEF DESCRIPTION OF THE DRAWING

The accompanying drawings which are incorporated in and constitute a part of this specification, illustrate several embodiments of the invention and, together with the description, serve to explain the principles of this invention.

FIG. 1(a) is a plan view showing the first embodiment of a connecting rod to which the present invention is applied, FIG. 1(b) is a front view of the embodiment, and FIG. 1(c) is a right side view of the embodiment.

DETAILED DESCRIPTION OF THE PREFERRED EMBODIMENT

Figure 2:
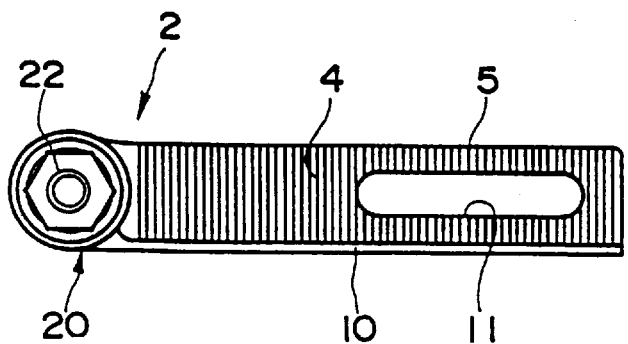
FIG. 2(a) is a plan view showing a first ball joint of the first embodiment and FIG. 2(b) is a front view of the first ball joint.
Figure 2:
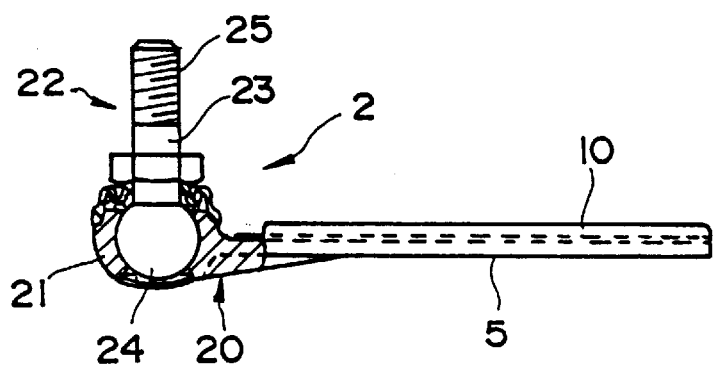

A connecting rod equipped with ball joints of the present invention is explained in detail in conjunction with attached drawings hereinafter.

FIG. 1(a) is a front view showing the first embodiment of a connecting rod to which the present invention is applied, FIG. 1(b) is a plan view thereof and FIG. 1(c) is a side view thereof. This connecting rod C1 is provided with the first and second ball joints 2, 3 at both ends of a rod-like connecting portion 1. By adjusting the length of the connecting portion 1, the distance d between the centers of the first and second ball joints 2, 3 can be adjust freely.

Furthermore, the connecting portion 1 is comprised of the first and second connecting arms 5, 6 which respectively have positioning teeth 4 arranged on surfaces thereof, and a bolt 7 and a nut 8 as fixing means which makes the first and second connecting arms 5, 6 engaged with each other in the condition that the positioning teeth 4 of these connecting arms 5, 6 are meshed with each other. The connecting arms 5, 6 are respectively formed integrally with holders 20, 30 of the first and second ball joints 2, 3.

Figure 3:
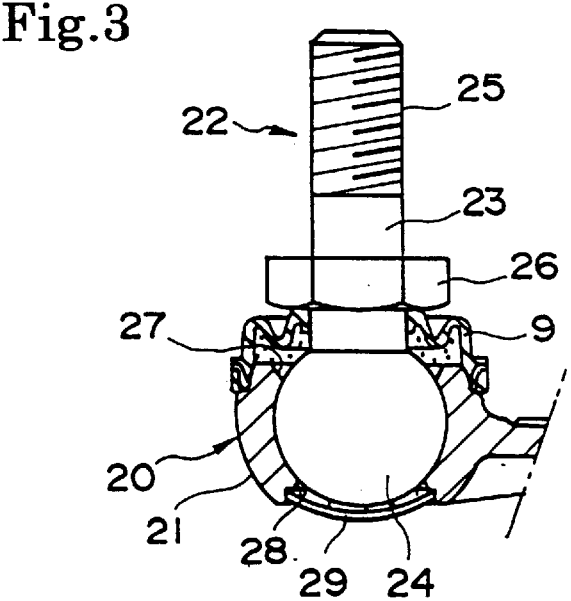
FIG. 3 is an enlarged view of an essential portion of the first ball joint according to the first embodiment.
Figure 4:
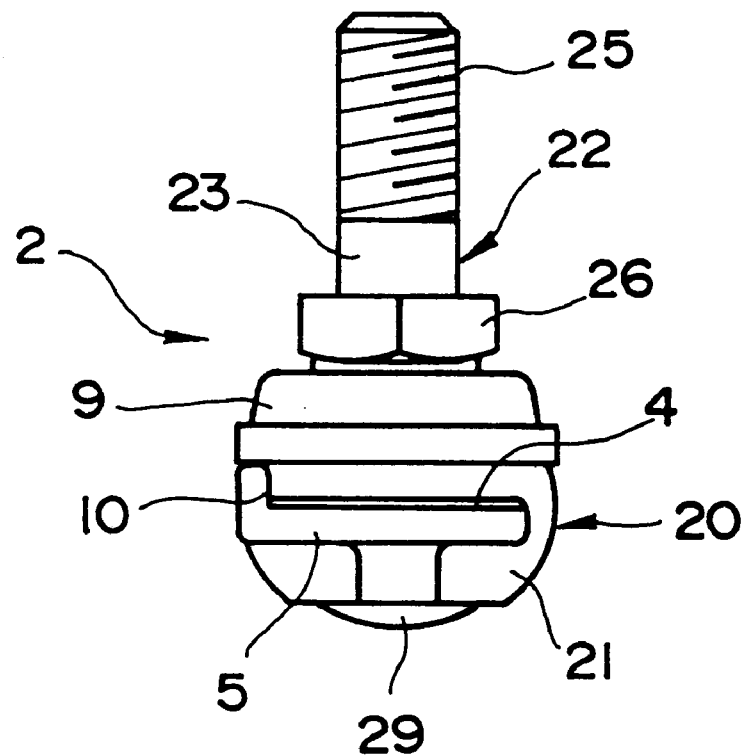
FIG. 4 is a right side view of the first ball joint according to the first embodiment.

As shown in FIG. 2(a), FIG. 2(b) and FIG. 3, the first ball joint 2 is comprised of the holder 20 with which a ball receiving portion 21 and the above-mentioned connecting arm 5 are integrally formed and a ball-shank 22 which is engaged with the ball receiving portion 21 of the holder 20. This ball-shank 22 is provided with a ball portion 24 having a high sphericity at the distal end of the shank portion 23 and a connecting male threaded portion 25 is provided to the shank portion 23. The ball portion 24 is rotatably and tiltably wrapped or received in the ball receiving portion 21 of the holder 20 while maintaining a necessary minimum gap. A hexagonal tool engaging portion 26 is formed on the ball-shank 22 and a spanner or a wrench for rotating the ball-shank 22 can be engaged with the tool engaging portion 26 at the time of joining the connecting male threaded portion 25 formed on the shank portion 23 to other movable part (not shown in drawings).

Furthermore, a connecting opening portion 27 is formed in the ball receiving portion 21 of the holder 20 and the shank portion 23 of the ball-shank 22 is protruded from this connecting opening portion 27. Furthermore, at a portion of the ball receiving portion 21 opposed to the connecting opening portion 27, a lubrication opening portion 28 which exposes the ball portion 24 of the ball-shank 22 is formed and a cap member 29 made of synthetic resin is mounted on this lubrication opening portion 28 so as to define a lubricant pocket which stores a lubricant such as grease. This cap member 29 is mounted on the ball receiving portion 21 such that it slightly pushes the ball portion 24 of the ball-shank 22 and hence, for example, in case an axial external force suddenly acts on the ball-shank 22 or the like, the occurrence of metal sound which may be caused when the ball portion 24 and the ball receiving portion 21 impinge into each other can be attenuated.

Still furthermore, a seal member 9 is mounted between an outer periphery of the ball receiving portion 21 and the ball-shank 22. This seal member 9 forms a lubricant pocket which stores a lubricant such as grease supplied to a gap defined between the ball portion 24 and the ball receiving portion 21 and prevents dust or the like from infiltrating into the gap from the connecting opening portion 27.

On the other hand, the first connecting arm 5 which is integrally formed with the ball receiving portion 21 is formed of a flat plate which extends in a direction perpendicular to the axis of the ball-shank 22. On a surface of the first connecting arm 5 at the same side as the shank portion 23, a large number of previously-mentioned positioning teeth 4 are arranged at a given pitch in a longitudinal direction of the first connecting arm 5 thus forming a rack. Furthermore, at one sides of these arranged positioning teeth 4, a side wall 10 is formed for stopping the lateral shift of the second connecting arm 6. An elongated hole 11 through which the bolt 7 passes is formed in this first connecting arm 5 in a longitudinal direction and the distance d between the centers can be adjusted by shifting the engaged position of the first and second connecting arms 5, 6 along this elongated hole 11.

The second ball joint 3 is comprised of the holder 30 and a ball-shank 32 as in the case of the first ball joint 2 and the structures of these holder 30 and the ball-shank 32 are substantially as same as those of the first ball joint 2. As shown in FIG. 1(b), however, in the connecting rod C1 of this embodiment, in the condition that the first ball joint 2 and the second ball joint 3 are combined, the shaft ends of respective ball-shanks 22, 32 extend in directions 180° opposite to each other and hence, side walls 10 for stopping the lateral shift between the first connecting arm 5 and the second connecting arm 6 are formed on the first connecting arm 5 and the second connecting arm 6 at opposite sides from each other.

The first ball joint 2 can be manufactured using a method disclosed in Japanese patent publication Hei 5-7786.

First of all, a steel ball for bearing use which constitutes the above-mentioned ball portion 24.is fixedly secured to the inside of a casting mold as a core. Molten metal made of zinc based alloy or aluminum based alloy (for example, grade 1, 2 of zinc alloy die casting, grade 3, 10 or 12 of aluminum alloy die casting of JIS) is poured into the casting mold so as to produce the holder 20 by die casting. Accordingly, the ball receiving portion 21 which wraps the steel ball for bearing use is formed and the connecting arm 5 on which the positioning teeth 4 are formed can be formed integrally with the ball receiving portion 21.

Subsequently, the shank portion 23 is welded to the steel ball for bearing use which is wrapped by the holder 20 by way of the connecting opening portion 27 formed in the holder 20 thus forming the ball-shank 22. As such a welding, a projection welding where the welding is performed by supplying an electric current to both of the shank portion 23 and the steel ball for bearing use in the condition that they are abutted to each other may preferably be used. When the ball-shank 22 is formed in the above manner, an external force is applied to the ball-shank 22 and the holder 20 so as to define a minute gap between the ball portion 24 of the ball-shank 22 and the ball receiving portion 21 of the holder 20 which are brought into close contact with each other at the time of die casting. Due to such a construction, the ball-shank 22 can perform the rotational movement and the tilting movement freely relative to the holder 20.

The second ball joint 3 can be manufactured exactly in the same manner as in the case of the first ball joint 2.

In this embodiment having the above-mentioned construction, the positioning teeth 4, 4 which are respectively formed on the first connecting arm 5 and the second connecting arm 6 are meshed with each other and, while holding such a meshed condition, the first connecting arm 5 and the second connecting arm 6 are fastened by engaging the nut 8 with the bolt 7 which is inserted into the elongated hole 11 thus completing the connecting rod C1 equipped with a pair of ball joints 2, 3 at both ends of the connecting portion 1.

In case the adjustment of the distance between the axes of the ball-shanks 22, 32 of the ball joints 2, 3, that is, the distance d of the centers is necessary, the fastening of the first and the second connecting arms 5, 6 by the bolt 7 and the nut 8 is loosened, subsequently, the meshed position of the positioning teeth 4 of the first and second connecting arms 5, 6 is shifted, and then the first and second connecting arms 5, 6 are fastened again by means of the bolt 7 and the nut 8 thus facilitating the adjustment of the distance d of the centers. Here, since the positioning teeth 4 are formed at a given pitch, an amount of adjustment of the distance d between the centers can be easily recognized by counting the number of the positioning teeth 4.

Furthermore, the holders 20, 30 of the first and second ball joints 2, 3 can be formed by die casting, and the ball receiving portions and the connecting arms 5, 6 can be integrally formed during such a casting, and the positioning teeth 4 can be cast integrally and hence, the first and second ball joints 2, 3 per se can be manufactured extremely easily at a low cost.

Figure 5:
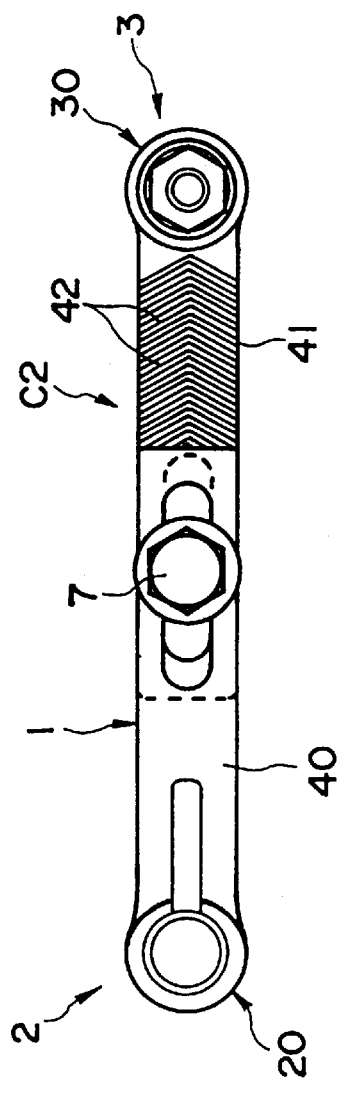
FIG. 5(a) is a plan view showing the second embodiment of a connecting rod to which the present invention is applied and FIG. 5(b) is a front view of the embodiment.
Figure 5:
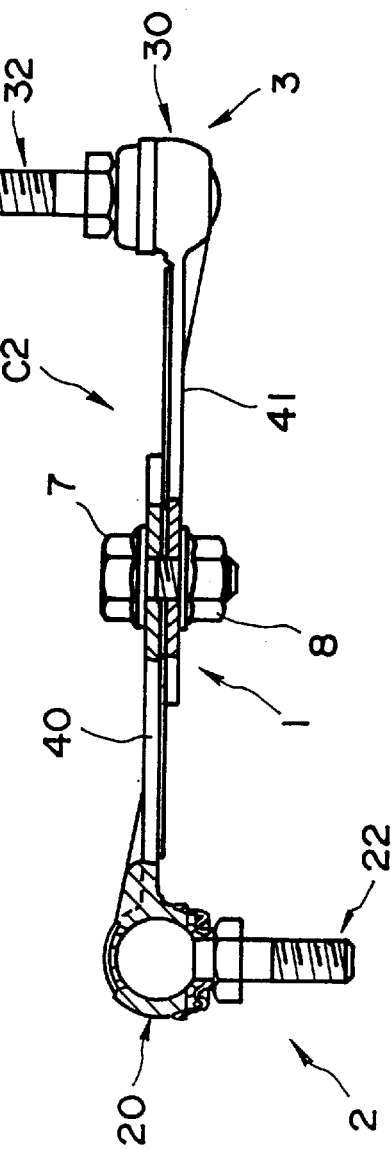
Figure 6:
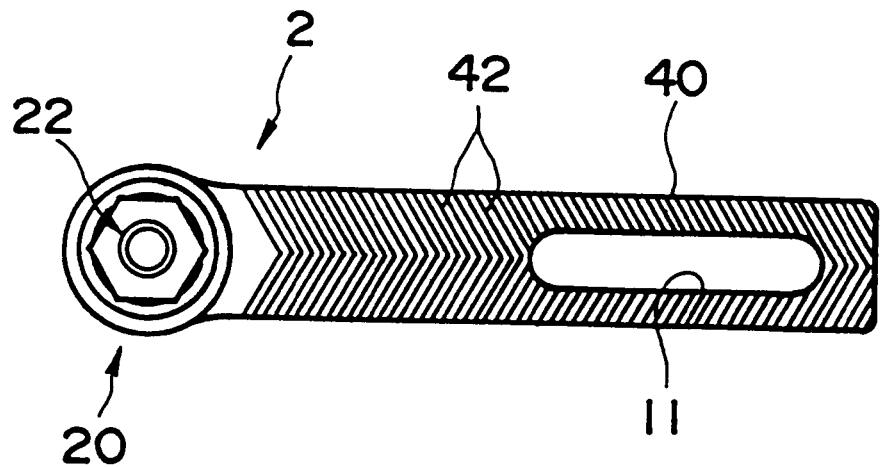
FIG. 6(a) is a plan view of a first ball joint according to the second embodiment and FIG. 6(b) is a front view of the embodiment.
Figure 6:
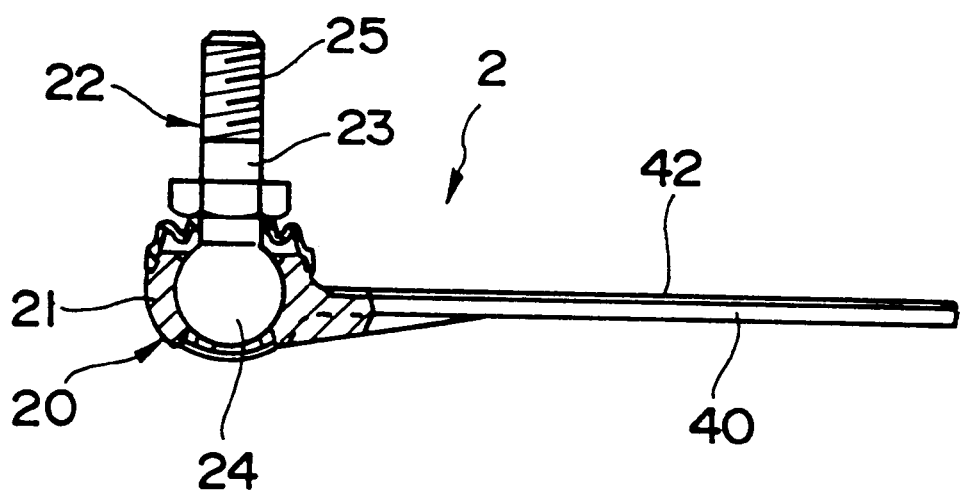

Subsequently, FIG. 5(a) and FIG. 5(b) show the second embodiment of the connecting rod to which the present invention is applied, and FIG. 6(a) and FIG. 6(b) show the first ball joint 2 which constitutes the connecting rod of the second embodiment.

Although this connecting rod C2 has substantially the same construction as that of the connecting rod C1 of the previously mentioned first embodiment, the connecting rod C2 differs from the connecting rod C1 in only the shape of positioning teeth 42 formed on first and second connecting arms 40, 41.

That is, in the connecting rod C2 of the second embodiment, the positioning teeth 42, 42 formed on the first and second connecting arms 40, 41 are formed in a herring bone shape. Due to such a construction, when the positioning teeth 42 of the first connecting arm 40 and the positioning teeth 42 of the second connecting arm 41 are meshed with each other and then the first and second connecting arms 40, 41 are fastened by means of the bolt 7 and the nut 8, the lateral shift of these connecting arms 40, 41 in a direction perpendicular to the longitudinal direction can be prevented. Accordingly, in the connecting rod C2 of the second embodiment, the side walls 10 which are provided to the connecting rod C1 of the first embodiment for preventing the lateral shift are not formed on the first and second connecting arms 40, 41. With respect to other parts, the connecting rod C2 has the same construction as that of the connecting rod C1 of the first embodiment and hence, here, the same symbols are affixed to these parts in FIG. 5(a) and FIG. 5(b) and the detailed explanation of these parts is eliminated.

Figure 7:
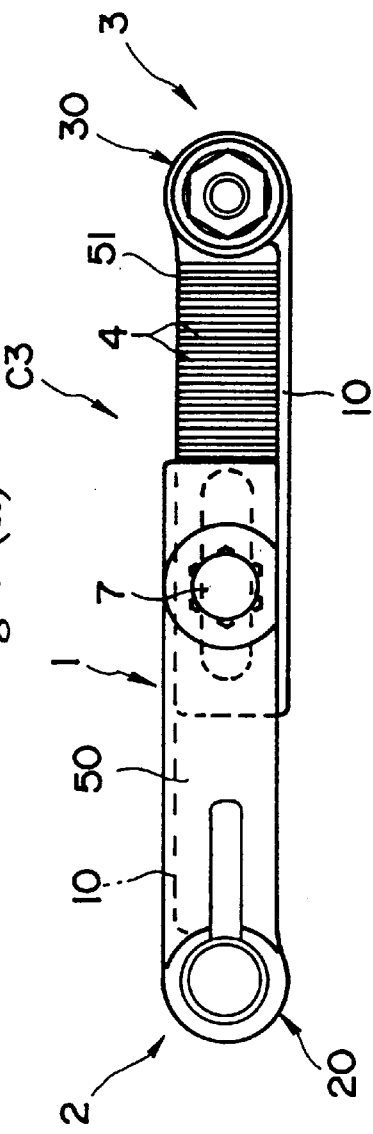
FIG. 7(a) is a plan view of the third embodiment of a connecting rod to which the present invention is applied and FIG. 7(b) is a front view of the embodiment.
Figure 7:
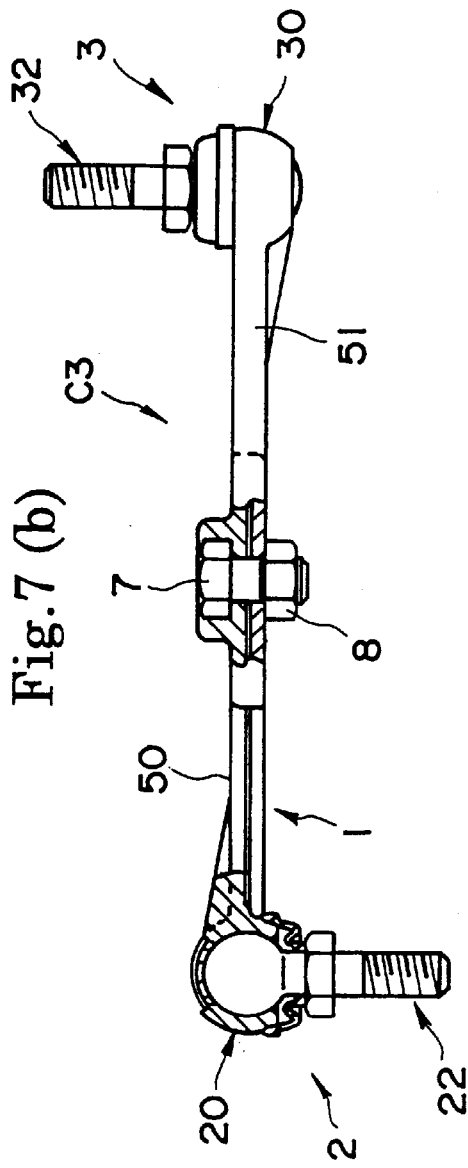
Figure 8:
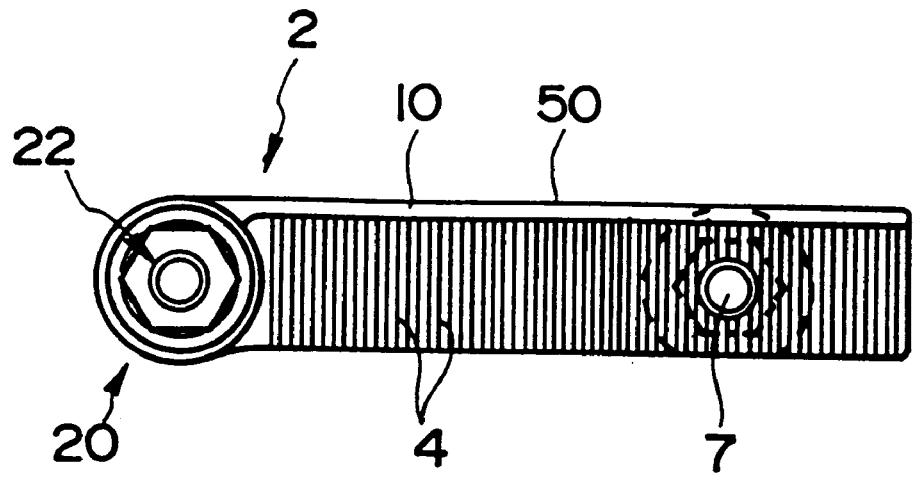
FIG. 8(a) is a plan view of a first ball joint according to the third embodiment and FIG. 8(b) is a front view of the embodiment.
Figure 8:
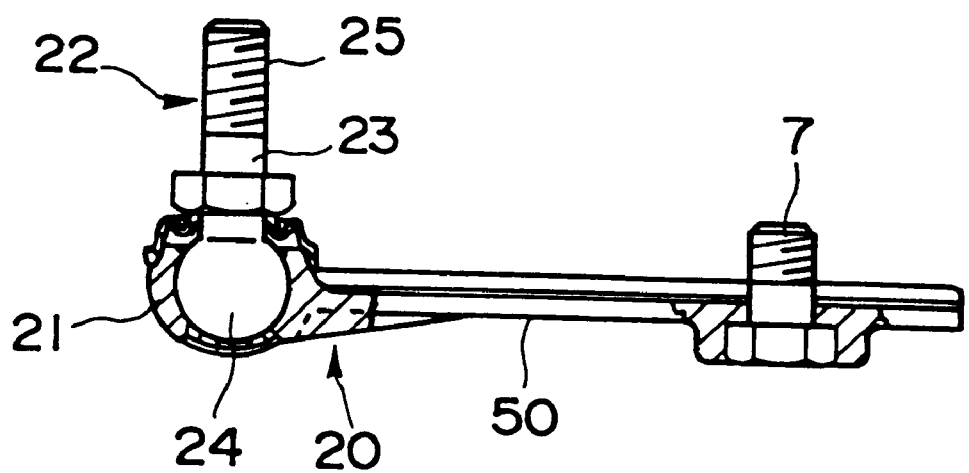

FIG. 7(a) and FIG. 7(b) show the third embodiment of the connecting rod to which the present invention is applied, and FIG. 8(a) and FIG. 8(b) show the first ball joint 2 which constitutes the connecting rod C3 of the third embodiment.

Although this connecting rod C3 has substantially the same construction as the connecting rod C1 of the first embodiment, the connecting rod C3 differs from the connecting rod C1 of the first embodiment only in that instead of inserting the bolt 7 which fastens the first connecting arm 5 and the second connecting arm 6 into the elongated holes 11 of these connecting arms 5, 6 after making their positioning teeth 4 meshed with each other, the bolt 7 is formed as a part of a first connecting arm 50 at the time of die casting the holder 20 of the first ball joint 2. Accordingly, in this embodiment, the construction of the second ball joint 3 is exactly as same as that of the connecting rod C1 of the first embodiment.

That is, with the connecting rod C3 of this third embodiment, casting of the holder 20 is performed in the condition that the bolt 7 is inserted into the inside of the casting mold so that the threaded portion of the bolt 7 can solidly erect from the surface of the first connecting arm 50 on which the positioning teeth 4 are formed. Accordingly, at the time of fastening the first connecting arm 50 and the second connecting arm 6 by means of the bolt 7 and the nut 8, it is unnecessary to engage the nut 8 with the bolt 7 while holding the bolt 7 with one hand. That is, after adjusting the meshed position of the positioning teeth 4, 4 of the first connecting arm 50 and the second connecting arm 6, while pinching the connecting arms 50, 6 with one hand, the nut 8 can be engaged with the bolt 7 with the other hand. Accordingly, making use of the connecting rod C3, the adjustment of the distance d of the centers can be performed more easily than the connecting rod C1 of the first embodiment.

What is claimed is:

1. A connecting rod comprising:

first and second ball joints made of ball-shanks and holders tiltably connected with said ball-shanks and a connecting portion which connects said holders of said first and second ball joints and is capable of adjusting the distance between the centers of said ball-shanks, wherein said connecting portion is comprised of first and second connecting arms molded integrally with said holders of said first and second ball joints by die casting and on which a plurality of positioning teeth which are capable of meshing with each other are respectively arranged in a longitudinal direction, and fixing means which makes said first and second connecting arms engaged with each other in a condition such that said positioning teeth of said first and second connecting arms are meshed with each other, wherein a distance between a center of said first and second ball joints is adjustable, wherein said positioning teeth formed on said first and second connecting arms are formed in a herring bone shape.

2. A connecting rod equipped with ball joints according to claim 1, wherein said fixing means is comprised of a bolt which is adapted to pass through holes formed respectively in each of said first and second connecting arms and a nut which is adapted to engage with said bolt, and said through holes are formed as elongated holes along an arrangement of said positioning teeth.

3. The connecting rod according to claim 2, wherein said bolt is formed as a part of said first connecting arm at the time of die casting said holder of said first ball joint.

4. A connecting rod equipped with ball joints according to claim 1, wherein said positioning teeth arranged on said first connecting arm and said second connecting arm respectively constitute racks of a given pitch.

5. A connecting rod equipped with ball joints according to claim 1, wherein side walls for preventing a lateral shift are formed on said first and second connecting arms in a longitudinal direction thereof.

* * * * *